(12) United States Patent
Ovcharenko (10) Patent No.: US 12,544,764 B2
(45) Date of Patent: Feb. 10, 2026

(54) CRUSHING SYSTEMS OPERATING REGIME CONTROLLING METHODS AND DEVICES

(71) Applicant: Nikolay Ovcharenko, Berlin (DE)

(72) Inventor: Nikolay Ovcharenko, Berlin (DE)

(*) Notice: Subject to any disclaimer, the term of this patent is extended or adjusted under 35 U.S.C. 154(b) by 295 days.

(21) Appl. No.: 18/568,464

(22) PCT Filed: Sep. 22, 2022

(86) PCT No.: PCT/RU2022/050299
§ 371 (c)(1),
(2) Date: Dec. 8, 2023

(87) PCT Pub. No.: WO2023/055259
PCT Pub. Date: Apr. 6, 2023

(65) Prior Publication Data
US 2024/0269684 A1   Aug. 15, 2024

(30) Foreign Application Priority Data
Sep. 29, 2021 (RU) ............................... 2021124377

(51) Int. Cl.
*B02C 17/18* (2006.01)
*B02C 17/22* (2006.01)
(Continued)

(52) U.S. Cl.
CPC ........ *B02C 17/1805* (2013.01); *B02C 17/225* (2013.01); *B02C 25/00* (2013.01);
(Continued)

(58) Field of Classification Search
CPC ... B02C 17/1805; B02C 17/225; B02C 25/00; B02C 2210/01; G01B 5/0002; G01B 5/06; G01B 21/08; G01N 3/56
See application file for complete search history.

(56) References Cited

U.S. PATENT DOCUMENTS

2004/0255679 A1* 12/2004 Valderrama Reyes ......................
G01H 1/003
73/649

FOREIGN PATENT DOCUMENTS

| CN | 107297253 | 10/2017 |
|----|-----------|---------|
| CN | 110142084 | 8/2019  |

(Continued)

*Primary Examiner* — Benjamin R Schmitt
(74) *Attorney, Agent, or Firm* — OGC Law, LLC; Thomas Joseph (57) ABSTRACT

Monitoring equipment for monitoring the performance of systems for crushing solid materials are disclosed. The working condition of an elastic liner material is diagnosed and load parameters are analyzed. Integrated into the liner material is a measuring means in the form of a monitoring sensor which works by measuring the axisymmetric bending of the elastic liner material in response to a known force. The data recorded is then sent to an information system for analytical processing. This includes detecting wear and monitoring whether a critical thickness of the liner material has been reached. A housing element (3), a movable sensing element (4) structurally adapted to be continuously thrust in the direction of the wearing surface of the liner material by a resilient pressuring means (5), and a transmitting element (6) are disclosed. The movable sensing element (4) records the magnitude of axisymmetric bending of the liner material and transmits this data to the transmitting element (6), thus providing for a resource-efficient operating regime that makes it possible to use the wearing liner material until critical wear indices are reached.

10 Claims, 3 Drawing Sheets

(51) Int. Cl.
*B02C 25/00* (2006.01)
*G01B 5/06* (2006.01)
*G16Y 40/40* (2020.01)
*G01B 21/08* (2006.01)
*G01N 3/56* (2006.01)

(52) U.S. Cl.
CPC ................ *G01B 5/06* (2013.01); *G16Y 40/40* (2020.01); *B02C 2210/01* (2013.01); *G01B 21/08* (2013.01); *G01N 3/56* (2013.01)

(56) References Cited

FOREIGN PATENT DOCUMENTS

| | | | | |
|---|---|---|---|---|
| EP | 2199719 | | 6/2010 | |
| EP | 3680018 A1 | * | 7/2020 | ............. G01L 5/246 |
| JP | S5435464 A | * | 3/1979 | ............. B02C 17/00 |
| RU | 2005102824 | | 8/2005 | |
| RU | 153992 | | 8/2015 | |
| RU | 2606810 | | 1/2017 | |
| WO | WO-9300997 A1 | * | 1/1993 | ........... B02C 17/225 |
| WO | WO-2022000072 A1 | * | 1/2022 | ........... G01N 29/348 |

* cited by examiner

CRUSHING SYSTEMS OPERATING REGIME CONTROLLING METHODS AND DEVICES

CROSS REFERENCE TO RELATED APPLICATIONS

The present application is a U.S. national stage application of PCT International Application No. PCT/RU2022/050299, filed Sep. 22, 2022, and published as PCT Publication WO/2023/055259 on Apr. 6, 2023, which claims priority to Russian Application No. 2021124377, filed on Sep. 29, 2021. The disclosures of the foregoing applications are hereby incorporated by reference in their entirety into the present application.

TECHNICAL FIELD

The disclosure relates to control and diagnostic equipment for monitoring the functioning of systems that grind solid components, namely drum milling machines, ball mills or similar devices that process minerals, building and other materials in factory or laboratory conditions.

TECHNICAL BACKGROUND

Since the second half of the 20th century, rubber materials have been used instead of metal as lining protective materials for structural elements of machines for grinding ore and building materials. Rubber has the ability to undergo large, reversible deformations, and is highly hydro-abrasive resistant and resistant to fatigue wear, as well as to corrosion.

Linings made of rubber materials in the designs of ball mills are currently widely used in the mining and processing industry, since they have a set of advantages, which include increased yield of a product of a given size, reduced wear of protective parts, low energy costs for grinding processes, increased repair and overhaul cycle of operation of lining sets, reduced noise level, etc.

In addition to rubber materials for lining kits of ore grinding equipment, other elastic materials have also proven themselves to be effective—polyurethane, polyethylene, various combinations of rubber, polyurethane and ceramics.

The main objective of the protective lining material is to prevent the destruction of structural elements and increase the operating life of equipment, as well as reduce equipment downtime associated with maintenance and repair. Important for the implementation of these tasks are operating conditions, grinding modes, physical properties of the crushed and ground materials, as well as diagnostic tools that allow monitoring and managing these processes.

There are some technologies known from the state of the art that use vibration diagnostic methods to solve the problems of increasing the grinding speed and increasing the service intervals of maintenance and repair, however, such methods do not have a high accuracy of analysis.

The technology for diagnosing the lining layer of an ore grinding device, which uses modem intelligent systems for processing incoming information, is known from the state of the art. (see Chinese Patent Publication No. CN 111715354, cl. B02C17/18, published 29 Sep. 2020 [1]). The technical solution [1] has the ability to transmit signals about the condition of the lining surface in real time.

This technology is a diagnostic method and allows instantly determine the state of wear of the protective surface of the ore grinding equipment, which is implemented by research and checking the operating condition of the elastic lining material of the grinding components, which occurs through the integration of the control and measuring tool into the body of the specified lining material.

The principle of operation is based on dividing the lining coating into several layers and embedding sensors using oil-based fillers in each of the layers, which record the readings. A camera located directly above the work area is also used, resulting in real-time information about the condition of the liner being transmitted to the intelligent control server via the image processing station.

The use of oil fillers in the applied control and measuring sensor is undesirable, since in the process of grinding, oil particles can get into the stirred components, which will disrupt the quality of the load composition and lead to inaccuracies in diagnosing the parameters of protective surfaces.

The operating task of the intelligent control server is to determine the degree of wear of the protective surface on the basis of the received loading images and their subsequent analytical comparison with the "normal" images, which cannot guarantee an error-free analysis, since the images can contain foreign parts that are not characteristic of the ground mass, which can be mistakenly perceived by the automation as markers that determine further operating steps. In addition, the presence of large amounts of dust or other particles in the air when grinding most materials makes it completely impossible to use properly optical inspection equipment.

Another system known from the state of the art is that registers the contact (impacts) of the crushed material against the walls of the protective coatings of the grinding bodies (see Canadian Patent Publication No. CA2456566, cl. B02C17/04, published 31 Jul. 2004). [2]).

This known solution [2] relates to the grinding of loads, and in particular to the control of the grinding components of drum and ball mills and similar industrial systems.

This system provides the ability to control the grinding mode of the load by performing the analysis of the grinding mass.

The operation of the solution [2] is based on the recognizing and classifying touches, taking into account the expected force of the impacts. Touches are classified and separated according to a Cartesian diagram in which the vertical axis is used to indicate contact between rock materials and the horizontal axis to indicate contact between metallic material.

The operation of the system [2] should not be considered as automatic, since the regulation of operating modes is carried out by the operator, who monitors the indication and, depending on the colour of the information light signal, manually adjusts the intensity, time and speed of the grinding components and therefore the quality of grinding material directly depends on the skills and responsibility of the operating personnel.

The characteristic feature of the system [2] is the conditional separation of the processing areas of the grinding chamber and the activation of only certain groups of measuring sensors, the operation of which is required taking into account the direction of rotation of the mill, which, on the one hand, will reduce the time for sending measuring signals, and on the other hand, measurement inaccuracies can occur due to the probability of mechanical damage to devices of the same group.

The closest in technical essence to the claimed method of controlling the operating mode of ore grinding systems is a method known from the prior art for monitoring the wear of the protective coating of a crushing system (see Chinese Patent Publication No. CN 110142084, cl. B02C2/00, published 20 Aug. 2019). [3]).

The known solution [3] relates to the field of monitoring the condition of crushing equipment, and in particular to the method of monitoring the wear of the grinding surfaces in crushing systems.

The known solution [3] involves the integration of a measuring instrument into the body of the protective lining material, which has the ability to determine the lining parameters in operating mode and subsequently send them to the analytical information system.

The operation of the system consists of three stages of implementation.

In the first step, the measured parameters at each diagnostic point are sent to the information system for comparison with the specified control conditions.

Then, at the next stage, the characteristics of the protective coating of the given section are determined taking into account the characteristics of the current section and the neighbouring section, as well as taking into account the signals received by the information system from both sections.

At the final stage, if the obtained local characteristics of the studied area correspond to the second initially specified control condition, then they return to the previous stage and form a cyclic control.

Among the disadvantages of the known technology [3] are noted possible inaccuracies and errors in the operation of the software of the information system that checks the signals received through feedback, which can distort the actual operating parameters and, as a result, form an incorrect cyclic verification algorithm.

An additional disadvantage is the need for periodic maintenance of the information system, which requires periodic updates of software and constant modernization of hardware systems to adapt to increasingly complex operational processes.

The closest in technical essence to the declared measuring device for controlling the operating mode of grinding systems is the device known from the prior art and capable of determining the wear of the lining of ball mills. (see CN 107297253, cl. B02C17/18, published on 27 Oct. 2017). [4]).

The known solution [4] refers to diagnostic tools that are used to study the operational parameters of protective coatings of grinding equipment processing solid materials.

The known device [4] determines the characteristics of the liner material and has a housing design that is integrated into the liner material, as a result of which it is possible to record the lining parameters and send the corresponding signals in real time to the control center.

The known device [4] contains a processor module, a wireless communication module, a power module and smart rods, the inside of which is hollow and is used for sealing.

The device has the ability to exchange data in real time with the control center, which allows to have up-to-date information about the condition of the lining and thereby select the optimal operating modes of the equipment, including avoiding unnecessary equipment stops associated with inspecting the conditions of protective products As a disadvantage, the smart rods used are independent complex diagnostic and transmitting devices that consume a significant amount of energy and use radio signals for transmission, which leads to the need of creation a complex control center, receiving and anti-interference systems, synchronization and signal processing. The need for a control center is inevitably associated with increased operating costs, in particular for equipment maintenance and repair, as well as for maintaining active functionality associated with updating system and software components.

It should also be noted that the device is quite difficult to install and configure its operation, since the design is not standard and requires special training of operating personnel. In addition, it is necessary to correctly integrate multiple smart rods to work together and configure auxiliary equipment that supports the ongoing diagnostic processes.

SUMMARY OF THE INVENTION

In various implementations, a method for diagnosing an operating state of an elastic lining material and analysing the parameters of a load being ground by the grinding components of ore grinding machines, carried out by integrating a measuring device into the lining material in the form of a control sensor is provided. The axisymmetric deflection of the elastic lining material under the influence of an external force is measured. The recorded data is sent in real time to the information system. The operating condition of the elastic lining material is diagnosed to determine the wear, which includes reaching the minimal thickness. A ground load is analysed is based on recording an impact on the surface of the lining by determining the number of ground fragments, the mass of ground fragments, and whether foreign parts are present in the mass.

In other implementations, a diagnostic measuring device for diagnosing the operational mode of ore grinding machines with the grinding components is provided. A housing element is configured for integration inside the elastic lining material. A movable sensitive element is structurally adapted due to the existing elastic pressure means to a constant stop in the direction of the abradable surface of the elastic lining material. The movable sensitive element records the axisymmetric deflections of the elastic lining material and transmits data to the transmitting element, so that the electrical signals allow the determination of the degree of wear of the elastic lining material, the minimal thickness, and the characteristics of the impact of the load on the surface of the lining material. The signals are transmitted in real time to an external information system for subsequent analytical processing.

DETAILED DESCRIPTION OF THE INVENTION

The technical problem solved by the proposed group of inventions is the lack of effective, reliable and economical diagnostic technology, which makes it possible to collect data in real time to control the operating modes of ore grinding machines loaded with minerals, building and other materials.

One disclosed technical result or solution to the existing technical problem is the making of elements of control and operation systems allowing to determine the condition of the protective coatings of grinding systems without stopping the equipment, with high accuracy, and thereby apply an optimal, resource-saving operating mode that allows using of the lining materials to maximal wear limits.

A measuring device integrated inside the lining can monitor the operating state of the elastic lining material and analyse the parameters of the ground load. The technical principle of the monitoring can be based on measuring the axisymmetric deflection of the elastic lining material under the influence of an external force and subsequent sending in real time of the recorded data to the information system for analytical processing. The diagnostics of the operating state of the elastic lining material leads to the determining its wear, including control of the minimal thickness, and the mentioned analysis of the ground load is based on data from recording its impact on the surface of the lining, resulting in the determination of the number and mass of ground fragments, as well as the possible presence of foreign parts in the ground mass.

It is theoretically known that if the rotationally symmetric plate with the simply supported edges is subjected to a uniform load, then its deflection is described, as follows:

$$w = Pd^2/64D(s)$$

where w is the deflection, P is the load, d is the diameter of the moving part of the lining material (i.e. the diameter of the boundary of the rigid fastening of the elastic lining material), and D (s) is the flexural rigidity of the lining, depending on the material and the thickness of the lining.

In some embodiments, the magnitude of the instantaneous changes in the deflection of the elastic lining material, which is affected by the load fragments during grinding, is sufficient to analyse information about the distribution of the mass of the parts being ground.

Typically, the integration of the control sensor into the elastic lining material is carried out during the thermoforming process of the lining material elements or by making mounting holes.

A technical result can be achieved through the configuration of a diagnostic measuring device for diagnosing the operational mode of ore grinding machines, which consists of a housing element designed to be integrated inside the elastic lining material, a movable sensitive element, structurally adapted due to the existing elastic means of pressure to a constant stop in the direction of the abraded surface of the elastic lining material. The movable sensitive element records the values of axisymmetric deflections of the elastic lining material, transmits data to the transmitting element, the electrical signals of which allow determining the degree of wear of the elastic lining material, including monitoring its minimal permissible thickness and characteristics of the impact of the load on the surface of the lining material. The signals are transmitted in real time to an external information system for subsequent analytical processing.

Generally, an elastic means of pressure is made as a compression spring.

The transmitting element interacting with the sensing element can be made as an induction sensor, eddy-current sensor or other displacement sensor capable of performing a similar task.

The transmitting element can be made as a battery, light, sound or other indicator that transmits signals in the event of failure of the elastic lining material.

The sensing element can be made in the form of a rod.

The end section of the rod can be made smooth, cone-shaped, or in another shape that ensures the movement of the rod when the lining material is shifted or broken.

Additionally, a technology for a mode monitoring of ball mills or similar ore grinding machines is disclosed.

The proposed technology provides an effective, reliable and cost-effective ability that is used in real time to collect data on the condition of ground components, linings and control the operating modes of ore grinding machines.

The basis of the proposed technology is a diagnostic measuring device in the form of a control sensor, which measures the value of the axisymmetric deflection of the lining material, and the subsequent sends the recorded data in real time and without stopping the equipment to an external information system, in which data is processed and optimal operating modes are developed. The proposed technology reduces operating costs, increases efficiency, service and repair intervals. In addition, customizable operating modes imply the choice of grinding speed, grinding intensity, as well as setting other operating parameters, the correct application of which will allow the optimal distribution of resources necessary for the operation of the equipment.

The essence of the proposed technology lies in the fact that the magnitude of the axisymmetric deflection of the elastic lining material is measured under the impact of the crushed material by housing measuring device integrated inside the lining material. The movable rod of the device due to elastic element constantly contacts with the wearing surface of the lining material, which deflections are recorded with high accuracy. These data are transmitted through the transmitting element to the information system, where optimal resource-saving operating mode decisions are made.

Thus, the disclosed invention achieves the given technical result and constructs a set of control and operation systems, which allows to determine the parameters of the grinding mode and the condition of the protective coatings of the grinding systems without stopping the equipment, with high accuracy and thereby develop an optimal, resource-saving mode of operation and allowing the use of lining material to the maximum wear limits.

The disclosed invention is illustrated by specific examples of execution and implementation, which, however, are not the only possible ones, but clearly demonstrate the achievement by these sets of essential features of an objectively manifested technical result that solves an actual technical problem.

The presented figures show the following elements and components that are part of the proposed diagnostic technology:

1—drum housing of the ore grinding machine;
2—diagnostic measuring device;
3—housing element;
4—sensitive element;
5—elastic pressure means;
6—transmitting element;
7—compression nut;
8—lock nut;
9—area for the location of electrical contacts;
10—grinding bodies.

Also, the following symbols are conventionally shown in the presented figures:

P—applied force;
w—the deflection value of the lining material;

A—point of separation of a grinding body;
G—the most distant point along the trajectory of movement;
B1, B2, B3—the points of falling of the grinding bodies, creating maximum deflections of the lining material, where the index denotes the numbers of the trajectories 1,2,3 from the highest to the lowest;
D—starting point for recording minimum deflections;
M—drum rotation mark;
P—recorded pulses;
P1—height of the maximum pulse;
t1, t2, t3—pulse registration time;
V—drum rotation speed The purpose of the following description of the proposed group of inventions is not to limit it to a specific design and embodiment, but rather to cover all possible additions that do not go beyond the scope of the presented claims.

The proposed method for controlling the process of grinding materials by grinding components of ore grinding machines involves monitoring that is directly related to diagnosing the operating state of the elastic lining material and analysing the parameters of the ground load.

The listed operational actions are carried out by integrating a diagnostic measuring device 2 into the lining material as a control sensor, measuring the axisymmetric deflection of the elastic lining material under the influence of a force (grinding bodies impacts) P (see FIG. 1) and subsequently sending in real time the recorded data to external information system for analytical processing.

Figure 1:
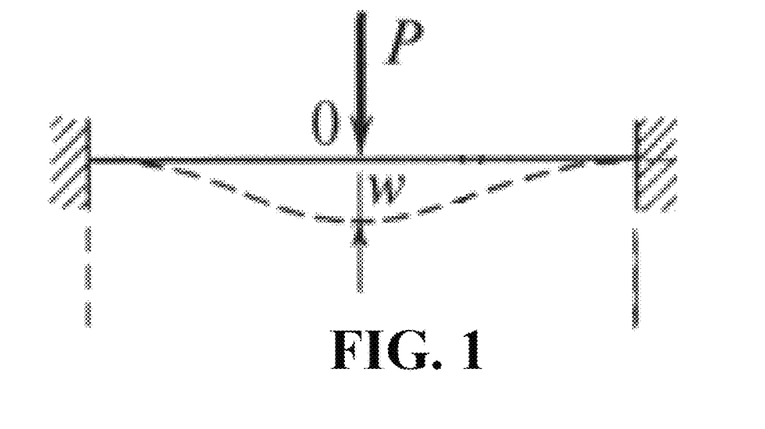
FIG. 1 illustrates a measuring the magnitude of the axisymmetric deflection of an elastic lining material under the load.

The diagnostics of the operating state of the elastic lining material includes the determining its wear and the achievement of the minimal permissible thickness. The analysis of the ground load is based on data on recording the impact on the surface of the protective lining material with the determining of the size and mass of the ground fragments, as well as the probable presence in a mass of foreign parts.

The diagnostic measuring device 2 consists of a housing element 3 designed to be integrated inside the elastic lining material, a movable sensitive element 4, structurally adapted, due to the existing elastic pressure means 5, to a constant stop towards the surface of the elastic lining material.

The movable sensitive element 4 records the amount of deflection of the protective lining material, which appears due to the impact on the lining material, and transmits the data to the transmitting element 6.

The electrical signals of the specified transmitting element 6 make it possible to determine the degree of wear of the elastic lining material, including monitoring its minimal permissible thickness, as well as the characteristics of the impact of the load on the surface of the lining material, and then they are transmitted in real time to an external information system for subsequent analytical processing.

In operation, a method for controlling the process of grinding a load with grinding bodies of ore grinding machines and a device for its implementation are based on the measuring the value of the axisymmetric deflection of an elastic (rubber, polymer) lining material under the influence of an external force P (see FIG. 1).

The average deflection of the lining material of the ore grinding machines depends on the residual thickness of the lining material. Instant changes in the deflection of the lining material under the influence of impacts of the components being ground provide information about the distribution of the mass of the parts being ground.

The first measured value is the wear of the lining material, which is determined by the value $1-s/so$, where so is the initial thickness of the lining layer, and s is the current value of the thickness of the lining layer. To register the wear of the lining layer, the signal from the sensitive element 4 is sent to the transmitting element 6 to determine the current value of the deflection of the lining layer. A movable rod is used as a sensitive element 4, and an induction, eddy-current or other displacement sensor is used as a transmitting element 6.

The second measured value are signals that the minimal thickness of the lining material has been reached. When the limit thickness of the lining layer is reached, the magnitude of the internal stresses inside the lining material under the action of the applied force P of the elastic pressure means 5 will exceed the strength limit of the material and destruction will occur in the center of the deflection. The sensitive element 4 of the diagnostic measuring device 2 will move in the destruction area that will be reflected in the electrical signal readings. In this case, the thickness of the lining layer at which the alarm should occur can be selected using the value P of the rigidity of the elastic pressure means 5, which is usually a compression spring, by the position of the compression nut 7.

Signalling that the minimal thickness of the lining layer has been reached is possible if the value of the signal from the transmitting element 6 exceeds the maximum calculated value.

In addition, a variant of the diagnostic measuring device 2 is provided, in which the transmitting element 6 is made as power supply and a group of electrical contacts in area 9, connected to any light, sound or other indicator device. In this case, the destruction of the lining layer under the influence of pressure of the sensitive element 4 will lead to its movement to the extreme position and the closure of the contacts in the area 9 where they are located, thereby turning on the indication.

The third measured value characterizes the parameters of impacts on the surface of the lining layer. The histogram (FIG. 3) of deflection w reflects the time-averaged sum of impact pulses P and characterizes the distribution of the mass of the ground fragments, while the signals of the transmitting element 6 are transmitted to the analysing device, which records the amplitude of movements of the sensitive element 4 in real time.

The diagnostic measuring device 2 through the transmitting element 6 transmits information about the wear of the lining layer, the achievement of the minimal thickness of the lining layer, as well as parameters of the size and mass of the components being ground into an information system.

Figure 2:
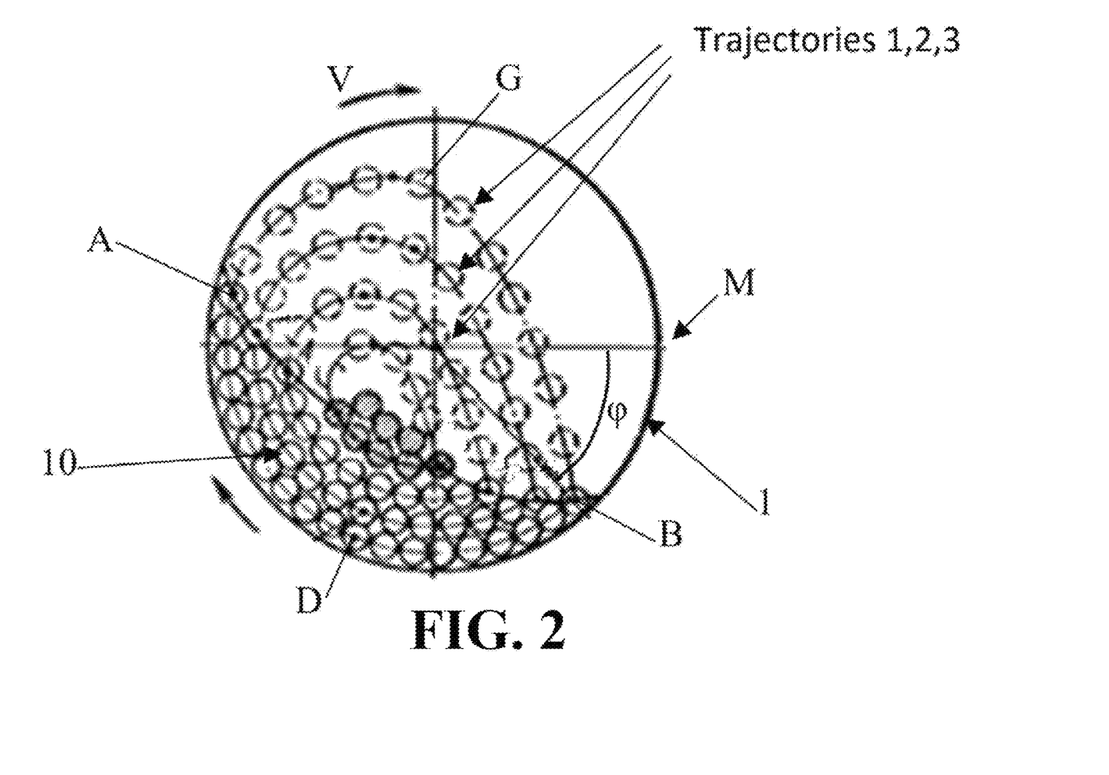
FIG. 2 illustrates the different grinding operating modes in the ball mill.

FIG. 2 shows different trajectories of grinding bodies from the highest rotation speed (trajectory 1) to lower ones (trajectories 2,3). The trajectories of grinding bodies 10 start from the separation point A through the most distant point along the movement trajectory G to the point of contact with drum B (1,2,3). The rotation speed of the ore grinding machine and the degree of its load determines the location of point B.

Diagnostic measuring device 2 is located on the inner surface of the rotating drum (FIG. 4) and receives impulses from the fall of grinding bodies 10.

Figure 4:
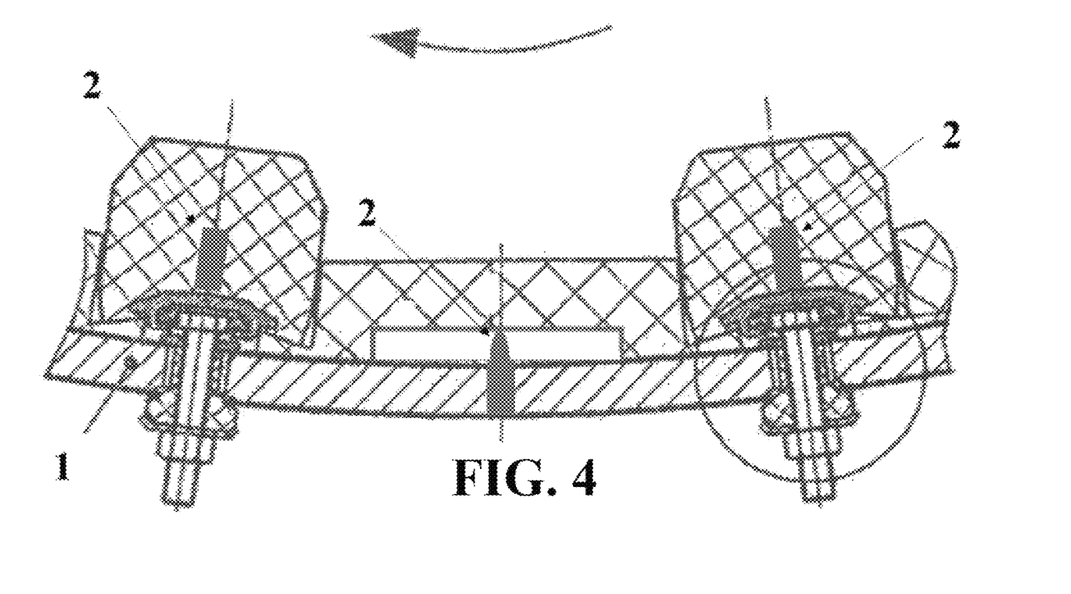
FIG. 4 illustrates the options for the location of diagnostic measuring devices (2) in the lining material.

In turn, the magnitude of the impact pulses P changes from larger to smaller depending on the trajectory of the grinding bodies 10. For example, from the maximum B (the point, where the impact is directly transmitted to the measuring device 2), to decreasing values, where part of the impulse energy is transmitted to the intermediate layers and dissipates. The minimum values of the impulses are at point D, where the recorded impulse shows the pressure of grinding bodies 10 rolling successively through the sensitive element 4 of the measuring device 2. In the upper part of the drum from the separation point A to the point of contact B, the measuring device gives a signal containing information about the value deflection of the residual layer of lining material.

Figure 3:
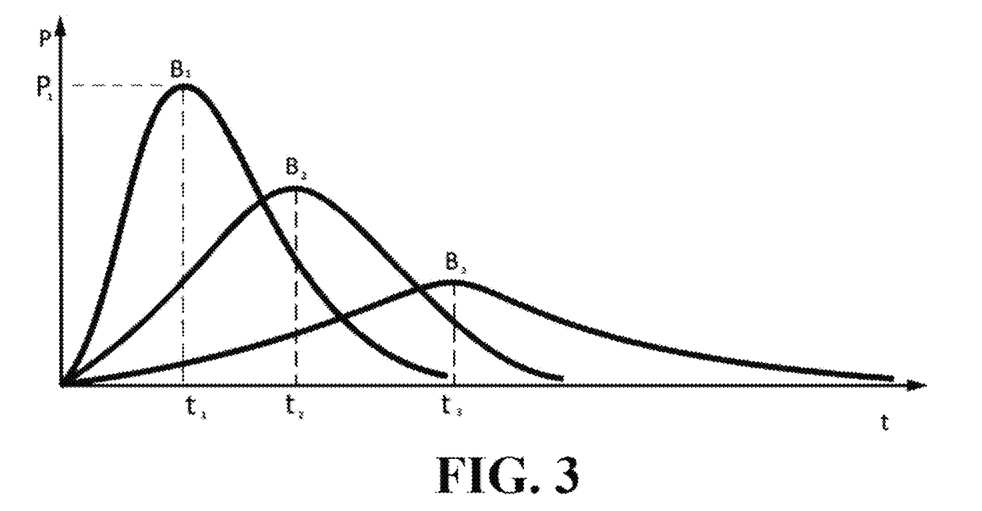
FIG. 3 illustrates a general view of the curves of the average lining deflection signal for one cycle of rotation of the ore grinding machine drum under different modes.

FIG. 3 shows a general view of the average signal of the measuring device 2 for one drum rotation cycle for different rotation speeds, provided that the grinding bodies 10 are selected to be of the same mass.

The height of the maximum pulse P1 characterizes the magnitude of the impact load on the lining material in a mixed grinding mode and is directly proportional to the average mass of grinding bodies 10 at a constant rotation speed V of the drum.

When a rotation mark M is located on the drum (FIG. 2), the angle $\phi$ of the point where the grinding bodies 10 hit the surface of the drum 1 can be determined as the difference between the time of the impact t1 and the mark (FIG. 3)

Due to the various trajectories 1-3 of bodies with various masses, the actual form of the signal curve of measuring device 2 will contain various maxima of pulses P, reflecting the impact load from the fall of fragments of fractions of different masses. Analysis of the height of each peak over time allows to track the dynamics of mass changes in each fraction and subsequently control the grinding mode depending on the task.

Data on the signal characteristics in each revolution are processed statistically. When using several measuring devices 2 at once, for example, located along the length of the drum, it is possible to monitor the uniformity of the loading of the grinding machine along the length, as well as the possible presence of extraneous massive elements by comparing the magnitude of the signals of different measuring devices 2 at the same, f. e. the lowest point.

Controlling the value of the angle $\phi$ allows to maximize the impact load, while it is possible to avoid contact of the grinding bodies 10 with the lining 1 at point B (1), which increases its wear, and distribute it between the grinding balls 10 at points B (2) and B (3) (see FIG. 2, FIG. 3).

Possible options for the location of measuring devices 2 are presented in FIG. 4.

Realization in the left and right parts of the fragment in FIG. 4 involves measuring the wear of the lining material located above the sensor itself along the radial axis of the drum. Wear of this part leads to the release and movement of the sensitive element 4 and its activation for wear. The location of measuring device 2 in this embodiment (on the left and right on the fragment) can also be at an angle to the radial axis, which makes it possible to control the directions of maximum wear.

Realization in the central part of the fragment in FIG. 4 implies free movement of the sensitive element 4 of the measuring device 2. In this case, the sensitive element 4 rests its end against the lining material on the inside of the groove. Movements of the material under the influence of impacts from the ground parts and grinding bodies 10 are recorded by a measuring device 2. Wear of the lining material leads to the extension of the sensitive element 4 to its maximum length and subsequently to the occurrence of a signal about critical wear.

Figure 5:
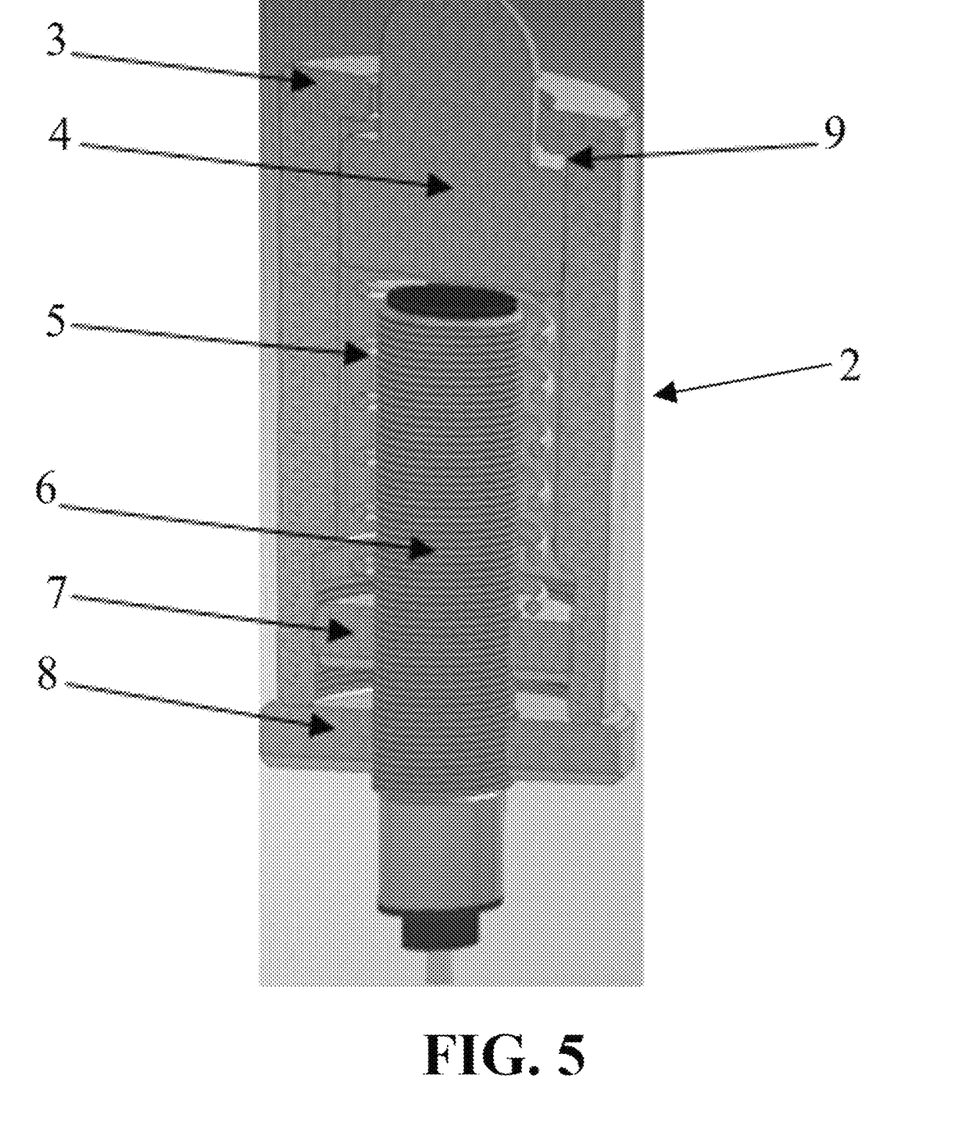
FIG. 5 illustrates the design of a diagnostic measuring device.

FIG. 5 shows the design of the diagnostic measuring device 2, which consist of a housing element 3 integrated into the lining material using mechanical preparation or during the thermoforming of structural elements. The sensitive element 4 spring-loaded by an elastic pressure means 5 rests against the surface of the lining material and exerts pressure on the surface of the lining material, causing it to bend by an amount of w. The value of deflection is recorded by the transmitting element 6 by measuring the gap between the sensitive element 4 and the sensitive part of the transmitting element 6. The degree of compression of the pressure means 5 is adjusted by the compression nut 7. Setting the initial gap of the transmitting element 6 is carried out by changing its position and fixing it with a lock nut 8.

The proposed invention can find wide application in industry and can be successfully used in mining, energy, construction and other industrial enterprises as diagnostic tools for equipment for ore, minerals, building and other materials.

The invention claimed is:

1. A method for diagnosing an operating state of an elastic lining material and analysing the parameters of a load being ground by the grinding components of ore grinding machines, carried out by integrating a measuring device into the lining material in the form of a control sensor, the method comprising:
    measuring the axisymmetric deflection of the elastic lining material under the influence of an external force;
    sending, in real time, the recorded data to the information system;
    diagnosing the operating condition of the elastic lining material to determine the wear, which includes reaching the minimal thickness;
    analysing a ground load based on recording an impact on the surface of the lining by determining the number of ground fragments, the mass of ground fragments, and whether foreign parts are present in the mass.

2. The method of claim 1, wherein the measurement of the axisymmetric deflection of the elastic lining material under the influence of an external force is determined by the following formula:

$$w = Pd^2/64D(s)$$

where w is the deflection, P is the load, d is the diameter of the moving part of the lining material, and D(s) is the flexural rigidity of the lining, depending on the material and the thickness of the lining.

3. The method of claim 1, wherein the integration of a control sensor inside the elastic lining material is carried out during the thermoforming of elements of the lining material or by making installation holes.

4. The method of claim 1, wherein instantaneous changes in the deflection of the elastic lining material under the impact of loading provide information on the distribution of the mass of the parts being ground.

5. A diagnostic measuring device for diagnosing the operational mode of ore grinding machines with the grinding components comprising:
    a housing element configured for integration inside the elastic lining material; and
    a movable sensitive element structurally adapted due an elastic pressure means to be biased in the direction of the abradable surface of the elastic lining material;
    wherein the movable sensitive element records the axisymmetric deflections of the elastic lining material and transmits data to the transmitting element, so that the electrical signals allow the determination of the degree of wear of the elastic lining material, the minimal thickness, and the characteristics of the impact of the load on the surface of the lining material; and wherein the signals are transmitted in real time to an external information system for subsequent analytical processing.

6. The diagnostic measuring device of claim 5, wherein the elastic pressure means is a compression spring.

7. The diagnostic measuring device of claim 5, wherein the transmitting element interacting with the sensitive element is made as an induction, eddy-current, optical and similar displacement sensor.

8. The diagnostic measuring device of claim 5, wherein the transmission element includes a power supply and a group of electrical contacts that transmit signals in the event of destruction of the elastic lining material to activate an indicator selected from the group consisting of a light indicator and a sight indicator.

9. The diagnostic measuring device of claim 5, wherein the sensitive element includes a rod.

10. The diagnostic measuring device of claim 9, wherein the rod includes an end section selected from the group consisting of a smooth end section, a cone-shaped end section, and an end section shaped to ensure movement of the rod when the lining material shifts or breaks down.

* * * * *